US012756341B2

(12) United States Patent
Taniguchi et al.

(10) Patent No.: US 12,756,341 B2
(45) Date of Patent: Oct. 6, 2026

(54) SYNCHRONOUS MACHINE CONTROL DEVICE, SYNCHRONOUS MACHINE CONTROL METHOD, AND ELECTRIC VEHICLE

(71) Applicant: HITACHI ASTEMO, LTD., Hitachinaka (JP)

(72) Inventors: Shun Taniguchi, Tokyo (JP); Kentaro Matsuo, Hitachinaka (JP); Toshiyuki Ajima, Tokyo (JP); Kazuaki Tobari, Tokyo (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 201 days.

(21) Appl. No.: 18/837,253

(22) PCT Filed: Feb. 27, 2023

(86) PCT No.: PCT/JP2023/007136

§ 371 (c)(1),
(2) Date: Aug. 9, 2024

(87) PCT Pub. No.: WO2023/210142

PCT Pub. Date: Nov. 2, 2023

(65) Prior Publication Data

US 2025/0141381 A1 May 1, 2025

(30) Foreign Application Priority Data

Apr. 25, 2022 (JP) ................................ 2022-071780

(51) Int. Cl.

| | |
|---|---|
| ***H02P 21/22*** | (2016.01) |
| ***H02P 21/00*** | (2016.01) |
| ***H02P 21/14*** | (2016.01) |

(52) U.S. Cl.
CPC .......... *H02P 21/22* (2016.02); *H02P 21/0003* (2013.01); *H02P 21/141* (2013.01)

(58) Field of Classification Search
CPC ..... H02P 21/22; H02P 21/0003; H02P 21/141
See application file for complete search history.

(56) References Cited

U.S. PATENT DOCUMENTS

2009/0256503 A1 10/2009 Ueda et al.
2011/0175558 A1* 7/2011 Kitanaka ................ H02P 21/22 318/400.3

(Continued)

FOREIGN PATENT DOCUMENTS

JP 2008-173006 A 7/2008
JP 2009-261066 A 11/2009

(Continued)

OTHER PUBLICATIONS

Jung et al., "A dynamic decoupling control scheme for high-speed operation of induction motors", IEEE Transactions on Industrial Electronics, vol. 46, No. 1 (1999).

(Continued)

*Primary Examiner* — Zoheb S Imtiaz
(74) *Attorney, Agent, or Firm* — Foley & Lardner LLP

(57) ABSTRACT

A synchronous machine control device drives and controls a synchronous machine, the synchronous machine control device including: a current command computation unit that calculates a difference between a current command value for the synchronous machine and an actual current flowing through the synchronous machine and generates a current command value by proportional-integral control; a voltage vector computation unit that generates a voltage command value including a coaxial voltage command value and an orthogonal axis voltage command value based on the current command value generated by the current command computation unit; a voltage limitation unit that limits the coaxial (Continued)

voltage command value in preference to the orthogonal axis voltage command value to prevent the voltage command value from exceeding a predetermined voltage limit value; and a correction amount calculation unit that calculates the amount of correction of a current command value for correcting the current command value based on limitation of voltage determined by the voltage limitation unit, the current command computation unit being configured to correct the current command value by the proportional-integral control based on the amount of correction of a current command value.

10 Claims, 15 Drawing Sheets

(56) References Cited

U.S. PATENT DOCUMENTS

2019/0165712 A1 5/2019 Pramod et al.
2023/0155529 A1 5/2023 Taniguchi et al.
2024/0025472 A1* 1/2024 Mori .................... B62D 5/0463
2025/0062710 A1* 2/2025 Iezawa .................... H02P 27/06

FOREIGN PATENT DOCUMENTS

JP 2021-151003 A 9/2021
WO WO-2015/130908 A1 9/2015

OTHER PUBLICATIONS

International Search Report with English Translation in corresponding International Application No. PCT/JP2023/007136, dated May 16, 2023.
Indian Examination Report issued in corresponding Indian Application No. 202417068372, dated Aug. 24, 2026.

* cited by examiner

SYNCHRONOUS MACHINE CONTROL DEVICE, SYNCHRONOUS MACHINE CONTROL METHOD, AND ELECTRIC VEHICLE

TECHNICAL FIELD

The present invention relates to a synchronous machine control device, a synchronous machine control method, and an electric vehicle.

BACKGROUND ART

To downsize a synchronous machine such as a synchronous motor, high speed of rotation of the synchronous motor and improvement of a voltage utilization rate are in progress. In particular, this tendency is remarkable in an electric vehicle such as an electric automobile because weight of the synchronous motor affects the amount of power consumption. Although the synchronous motor is controlled by a synchronous machine control device using high voltage up to near a voltage limit value of an inverter to improve the voltage utilization rate, the voltage needs to be limited to prevent a voltage command value from exceeding the voltage limit value.

Limitation of voltage having been conventionally performed will be described with reference to FIGS. 1 and 2. FIG. 1 is a diagram illustrating voltage vectors in dq-axis coordinates. The voltage vectors are divided into a coaxial voltage vector 215 (combined component of a component 223 acting on d-axis voltage from a d-axis current command and a component 224 acting on q-axis voltage from a q-axis current command) acting coaxially and an orthogonal axis voltage vector 213 (combined component of a component 222 acting on the q-axis voltage from the d-axis current command and a component 221 acting on the d-axis voltage from the q-axis current command) acting on an orthogonal axis. The voltage vector 211 acquired by combining the coaxial voltage vector 215 and the orthogonal axis voltage vector 213 is limited in amplitude to fall within a voltage limit value 217 without changing a direction (voltage phase angle) of the voltage vector 211, thereby acquiring a voltage vector 219. Although the orthogonal axis voltage vector 213 acting on the orthogonal axis suppresses interference between the dq axes, limitation on the orthogonal axis voltage vector 213 causes oscillation of a fundamental frequency f0 in a d-axis current 201 and a q-axis current 203 due to an interference component between the dq axes as in a graph of fundamental waves of the d-axis current and the q-axis current shown in FIG. 2.

PTL 1 proposes a method for generating a second current command value allowing a current detection value and a current command value to coincide with each other, and performing current control using an inverse model of a motor model including control. PTL 2 proposes a method for generating a second magnetic flux command value allowing a magnetic flux estimation value and a magnetic flux command value to coincide with each other, and performing current control using an inverse model of a motor model including control. NPL 1 proposes an algorithm for enhancing torque transient response.

CITATION LIST

Patent Literature

PTL 1: JP 2008-1730064 A
PTL 2: JP 2021-151003 A

Non Patent Literature

NPL 1: “A dynamic decoupling control scheme for high-speed operation of induction motors” IEEE Transactions on Industrial Electronics, Vol. 46, Iss. 1 (1999)

SUMMARY OF INVENTION

Technical Problem

Conventional control has a problem that stable current control cannot be performed near a voltage limit.

Solution to Problem

A synchronous machine control device according to the present invention drives and controls a synchronous machine, the synchronous machine control device including: a current command computation unit that calculates a difference between a current command value for the synchronous machine and an actual current flowing through the synchronous machine and generates a current command value by proportional-integral control; a voltage vector computation unit that generates a voltage command value including a coaxial voltage command value and an orthogonal axis voltage command value based on the current command value generated by the current command computation unit; a voltage limitation unit that limits the coaxial voltage command value in preference to the orthogonal axis voltage command value to prevent the voltage command value from exceeding a predetermined voltage limit value; and a correction amount calculation unit that calculates the amount of correction of a current command value for correcting the current command value based on limitation of voltage determined by the voltage limitation unit, the current command computation unit being configured to correct the current command value by the proportional-integral control based on the amount of correction of a current command value.

A synchronous machine control device according to the present invention drives and controls a synchronous machine, the synchronous machine control device including: a first magnetic flux command computation unit that generates a first magnetic flux command value from a current command value for the synchronous machine; a magnetic flux estimation unit that acquires a magnetic flux estimation value from an actual current flowing through the synchronous machine; a second magnetic flux command computation unit that calculates a difference between the first magnetic flux command value and the magnetic flux estimation value, and generates a second magnetic flux command value by proportional-integral control; a voltage vector computation unit that generates a voltage command value including a coaxial voltage command value and an orthogonal axis voltage command value based on the second magnetic flux command value; a voltage limitation unit that limits the coaxial voltage command value in preference to the orthogonal axis voltage command value to prevent the voltage command value from exceeding a predetermined voltage limit value; and a correction amount calculation unit that calculates the amount of correction of a magnetic flux command value for correcting the second magnetic flux command value based on limitation of voltage determined by the voltage limitation unit, the second magnetic flux command computation unit being configured to correct the second magnetic flux command value by the proportional-integral control based on the amount of correction of a magnetic flux command value.

A synchronous machine control method according to the present invention is for driving and controlling a synchronous machine, the method including: calculating a difference between a current command value for the synchronous machine and an actual current flowing through the synchronous machine and generating a current command value by proportional-integral control; generating a voltage command value including a coaxial voltage command value and an orthogonal axis voltage command value based on the generated d current command value; limiting the coaxial voltage command value in preference to the orthogonal axis voltage command value to prevent the voltage command value from exceeding a predetermined voltage limit value; calculating the amount of correction of a current command value for correcting the current command value based on the limitation; and correcting an integrator coaxially applied to the proportional-integral control based on the amount of correction of a current command value, the amount corresponding to an excess of a coaxial component in an excess of voltage exceeding the voltage limit value due to the limitation.

Advantageous Effects of Invention

The present invention enables implementing stable current control even near a voltage limit.

DESCRIPTION OF EMBODIMENTS

Hereinafter, embodiments of the present invention will be described with reference to the drawings. The description and drawings below are examples for describing the present invention, and are eliminated and simplified as appropriate for the sake of clarity of description. The present invention can be also implemented in various other forms. Unless otherwise specified, each component may be singular or plural.

Although a permanent magnet synchronous motor (PMSM) will be described as an example of a synchronous machine in the following description, effect of the present invention is not limited to the permanent magnet synchronous motor, and a synchronous machine such as a synchronous reluctance motor, a permanent magnet synchronous generator, or a winding-type synchronous machine can obtain a similar effect. Hereinafter, the synchronous machine is referred to as a motor.

Although synchronous machine control devices 100 and 100' will be described with a plurality of block configurations in the following description, at least one or more block configurations may be implemented by a program and a processor (e.g., CPU, GPU) that processes the program. The program is executed by the processor (e.g., CPU, GPU) to perform predetermined processing using a storage resource (e.g., a memory) and/or an interface device (e.g., a communication port) as appropriate, so that the processor may be regarded as a main component of performing the predetermined processing. Similarly, the main component of the processing performed by executing the program may be a controller, a device, a system, a computer, or a node, which includes a processor. The main component of the processing performed by executing the program may be an arithmetic unit, and may include a dedicated circuit (e.g., FPGA or ASIC) that performs specific processing.

The program may be installed in a device such as a computer from a program source. The program source may be a program distribution server or a computer-readable storage medium, for example. When the program source is a program distribution server, the program distribution server may include a processor and a storage resource that stores a distribution target program, and the processor of the program distribution server may distribute the distribution target program to another computer. In the description below, two or more programs may be implemented as one program, or one program may be implemented as two or more programs.

First Embodiment

Figure 1:
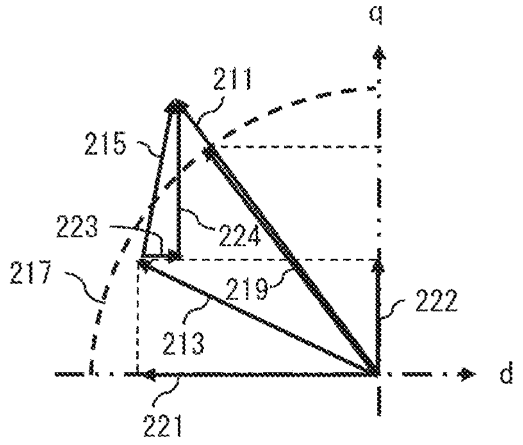
FIG. 1 is a diagram illustrating voltage vectors in the background art in dq-axis coordinates.
Figure 2:
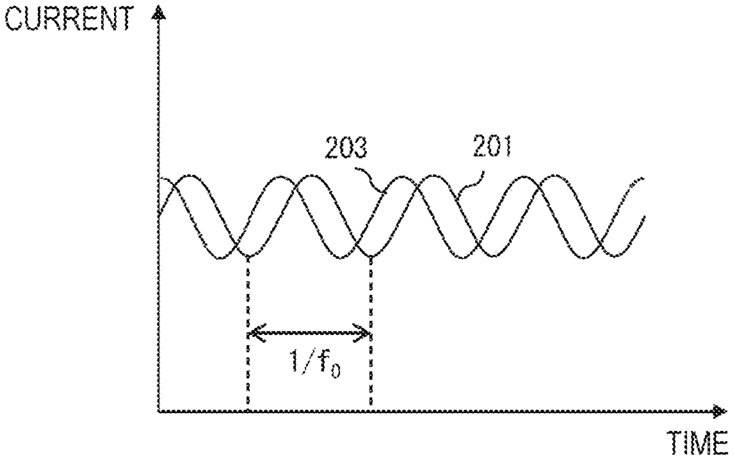
FIG. 2 is a graph illustrating fundamental waves of a d-axis current and a q-axis current in the background art.
Figure 3:
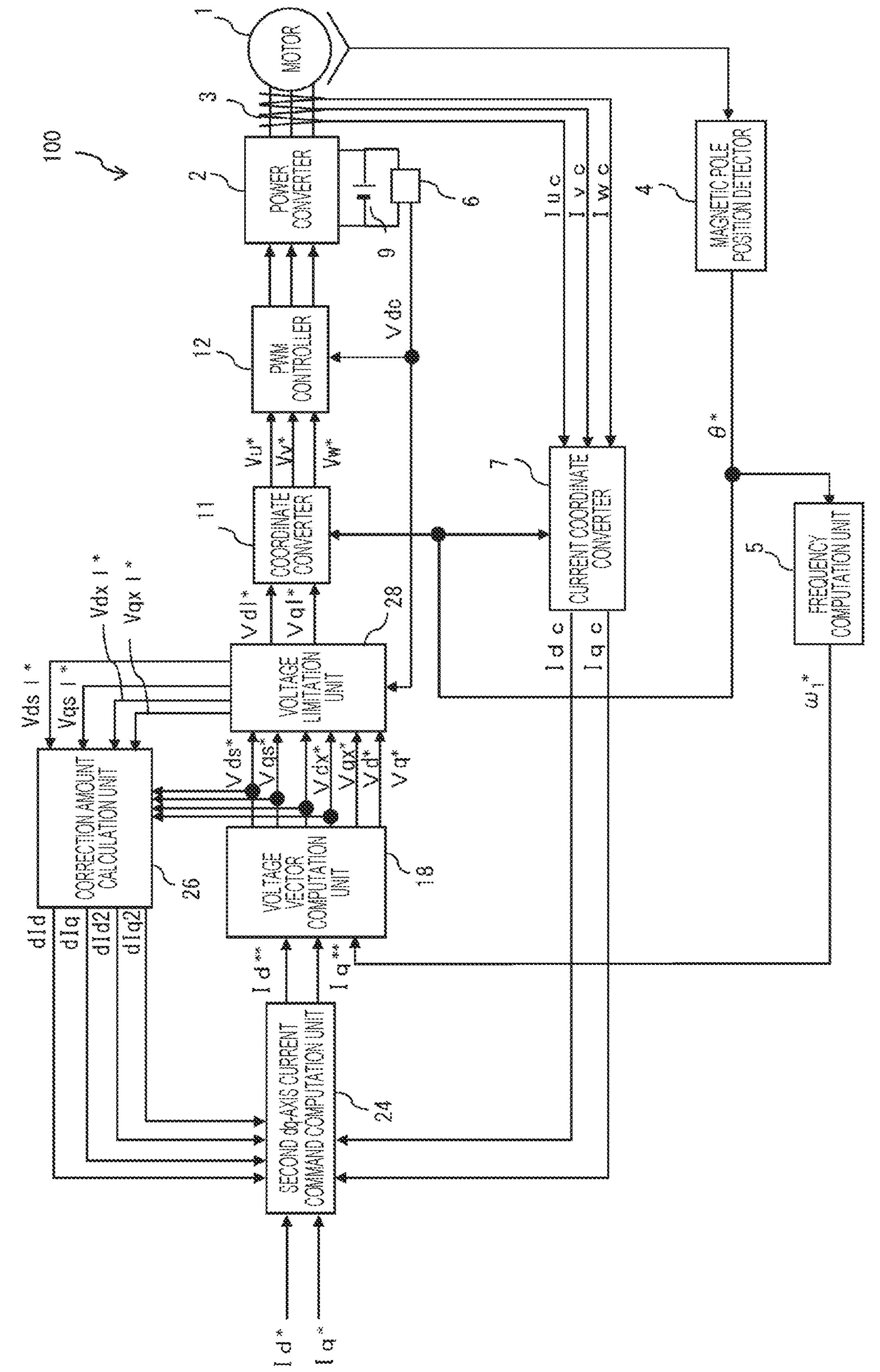
FIG. 3 is a block diagram of a synchronous machine control device according to a first embodiment.

FIG. 3 is a block diagram of the synchronous machine control device 100 according to a first embodiment of the present invention.

The synchronous machine control device 100 drives a motor 1 by controlling a power converter 2. The power converter 2 receives DC power supplied from a DC voltage source 9 such as a battery. The synchronous machine control device 100 includes a phase current detector 3, a magnetic pole position detector 4, a frequency computation unit 5, a current coordinate converter 7, a second dq-axis current command computation unit 24, a correction amount calculation unit 26, and a voltage limitation unit 28.

The power converter 2 constitutes an inverter, and converts DC power from the DC voltage source 9 such as a battery into AC power according to a gate signal to be described later to drive the motor 1. Semiconductor switching elements constituting the inverter are IGBTs, MOSFETs, and other power semiconductor elements.

The phase current detector 3 includes a Hall current transformer (CT) or the like, and detects three-phase currents Iuc, Ivc, and Iwc of a U phase, a V phase, and a W phase, the currents flowing from the power converter 2 to the motor 1.

The magnetic pole position detector 4 includes a resolver or the like, and detects a magnetic pole position of the motor 1 to output magnetic pole position information θ*.

The frequency computation unit 5 outputs speed information ω1* acquired by differential calculation, for example, from the magnetic pole position information θ* detected by the magnetic pole position detector 4.

The current coordinate converter 7 performs coordinate transformation on the currents Iuc, Ivc, Iwc detected by the phase current detector 3 based on the magnetic pole position information θ* detected by the magnetic pole position detector 4 to output a d-axis current detection value Idc and a q-axis current detection value Iqc.

The second dq-axis current command computation unit 24 outputs a second d-axis current command value Id and a second q-axis current command value Iq by proportional-integral control to allow the d-axis current command value Id* to coincide with the d-axis current detection value Idc, and the q-axis current command value Iq* to coincide the q-axis current detection value Iqc. That is, the second dq-axis current command computation unit 24 calculates a difference between a current command value for the motor 1 and an actual current flowing through the motor 1 to generate a current command value by proportional-integral control. Although details will be described later, an integral term of the proportional-integral control is corrected using amounts dId, dIq, dId2, and dIq2 of correction of current command values, the amounts being calculated by the correction amount calculation unit 26.

A voltage vector computation unit 18 outputs a d-axis voltage command value Vd*, a q-axis voltage command value Vq*, a d-axis coaxial voltage command value Vds*, a q-axis coaxial voltage command value Vqs*, a d-axis orthogonal axis voltage command value Vdx*, and a q-axis orthogonal axis voltage command value Vqx* to the voltage limitation unit 28 based on the second d-axis current command value Id, the second q-axis current command value Iq, and the speed information ω1*. Additionally, the d-axis coaxial voltage command value Vds*, the q-axis coaxial voltage command value Vqs*, the d-axis orthogonal axis voltage command value Vdx*, and the q-axis orthogonal axis voltage command value Vqx* are output to the correction amount calculation unit 26. That is, the voltage vector computation unit 18 generates a coaxial voltage command value and an orthogonal axis voltage command value based on a current command value generated by the second dq-axis current command computation unit 24. Details will be described later.

The voltage limitation unit 28 receives the d-axis voltage command value Vd*, the q-axis voltage command value Vq*, the d-axis coaxial voltage command value Vds*, the q-axis coaxial voltage command value Vqs*, the d-axis orthogonal axis voltage command value Vdx*, the q-axis orthogonal axis voltage command value Vqx*, and the DC voltage information Vdc from the DC voltage detector 6, and the d-axis voltage command value Vd* and the q-axis voltage command value Vq* are subjected to limitation of voltage. Then, a d-axis voltage command value Vdl* and a q-axis voltage command value Vql* are output to a coordinate converter 11. A d-axis coaxial voltage Vdsl* after the limitation of voltage, a q-axis coaxial voltage Vqsl* after the limitation of voltage, a d-axis orthogonal axis voltage Vdxl*, and a q-axis orthogonal axis voltage Vqxl* are output to the correction amount calculation unit 26. The voltage limitation unit 28 limits the coaxial voltage command value in preference to the orthogonal axis voltage command value to prevent the voltage command value from exceeding a predetermined voltage limit value. Details of the voltage limitation unit 28 will be described later.

The correction amount calculation unit 26 receives the d-axis coaxial voltage command value Vds*, the q-axis coaxial voltage command value Vqs*, the d-axis orthogonal axis voltage command value Vdx*, and the q-axis orthogonal axis voltage command value Vqx* from the voltage vector computation unit 18, and receives the d-axis coaxial voltage Vdsl*, the q-axis coaxial voltage Vqsl*, the d-axis orthogonal axis voltage Vdxl*, and the q-axis orthogonal axis voltage Vqxl* from the voltage limitation unit 28. Then, the second dq-axis current command computation unit 24 calculates the amounts dId, dIq, dId2, and dIq2 of correction of current command values for implementing anti-windup control. That is, the correction amount calculation unit 26 calculates the amount of correction of a current command value for correcting the current command value based on limitation determined by the voltage limitation unit 28. Details will be described later.

The coordinate converter 11 performs coordinate transformation on the d-axis voltage command value Vdl* and the q-axis voltage command value Vql* output by the voltage limitation unit 28 using the magnetic pole position information θ* detected by the magnetic pole position detector 4 to output three-phase voltage command values Vu*, Vv*, and Vw*. A PWM controller 12 performs, for example, triangular wave comparison using the three-phase voltage command values Vu*, Vv*, and Vw* and the DC voltage information Vdc on the DC voltage source 9 detected by the DC voltage detector 6, and outputs the gate signal to the power converter 2.

Figure 4:
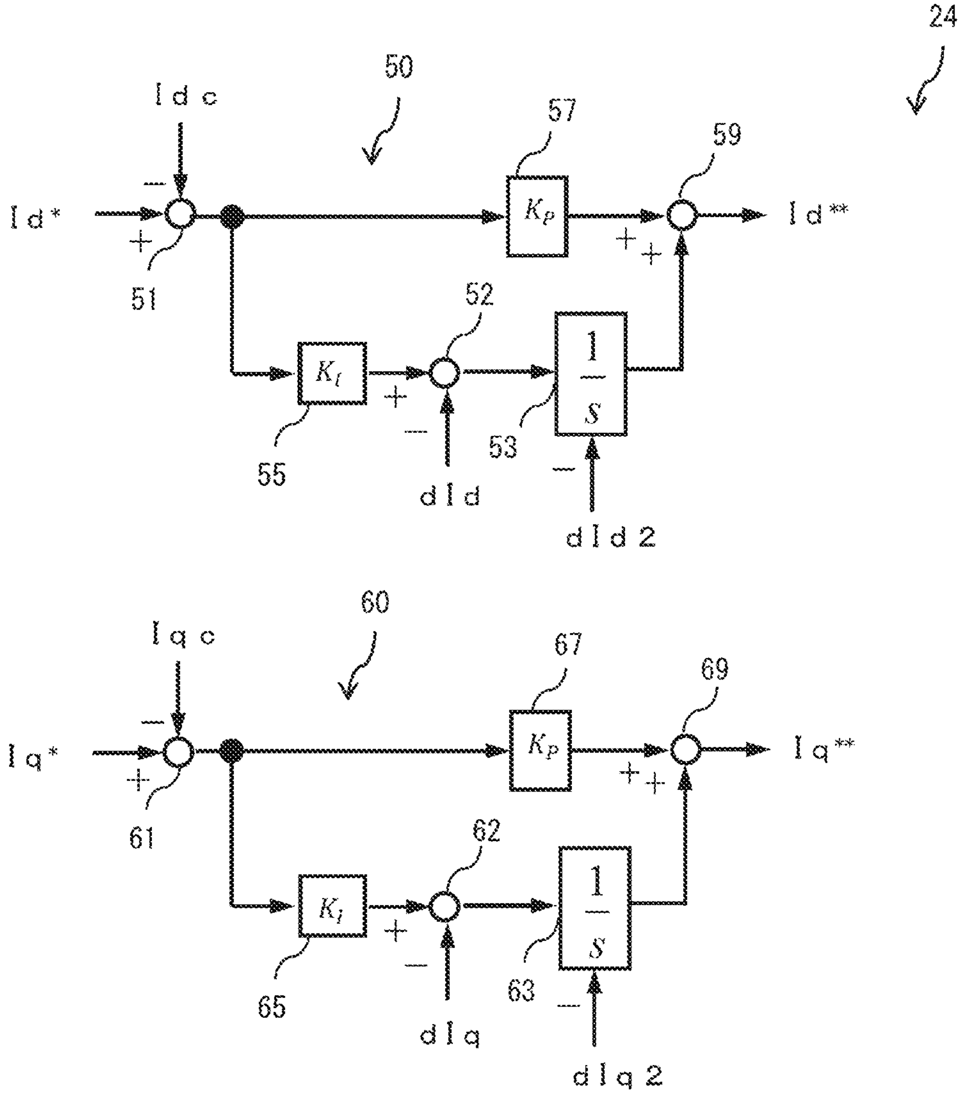
FIG. 4 is a configuration diagram of a second dq-axis current command computation unit according to the first embodiment.

FIG. 4 is a configuration diagram of the second dq-axis current command computation unit 24.

The second dq-axis current command computation unit 24 includes a proportional-integral controller 50 that receives the d-axis current command value Id* and a proportional-integral controller 60 that receives the q-axis current command value Iq*.

The proportional-integral controller 50 of the second dq-axis current command computation unit 24 corrects the d-axis current command value ld* by the proportional-integral control based on the amounts dld and dld2 of correction of a current command value, and outputs the second d-axis current command value ld. Specifically, a subtractor 51** subtracts the d-axis current detection value ldc from the d-axis current command value ld*. A result of the subtraction is input to one side of an adder 59 through a proportional control gain 57. The result of the subtraction using the subtractor 51 is input to an integrator 53 after the amount dld of correction of a current command value is subtracted from output of an integration control gain 55 using the subtractor 52. The integrator 53 subtracts the amount dld2 of correction of a current command value from the calculation result of the integrator 53 and inputs a result of the subtraction to the other side of the adder 59. A result of the addition of the adder 59 is output as the second d-axis current command value ld**.

The proportional-integral controller 60 of the second dq-axis current command computation unit 24 corrects the q-axis current command value lq* by the proportional-integral control based on the amounts dlq and dlq2 of correction of current command values, and outputs the second d-axis current command value lq. Specifically, a subtractor 61** subtracts a q-axis current detection value lqc from a q-axis current command value lq*. A result of the subtraction is input to one side of an adder 69 through a proportional control gain 67. A result of the subtraction using the subtractor 61 is input to an integrator 63 after the amount dlq of correction of a current command value is subtracted from output of an integration control gain 65 using a subtractor 62. The integrator 63 subtracts the amount dlq2 of correction of a current command value from the result in the integrator 63 and inputs a result of the subtraction to the other side of the adder 69. A result of the output of the adder 69 is output as the second d-axis current command value lq**.

Figure 5:
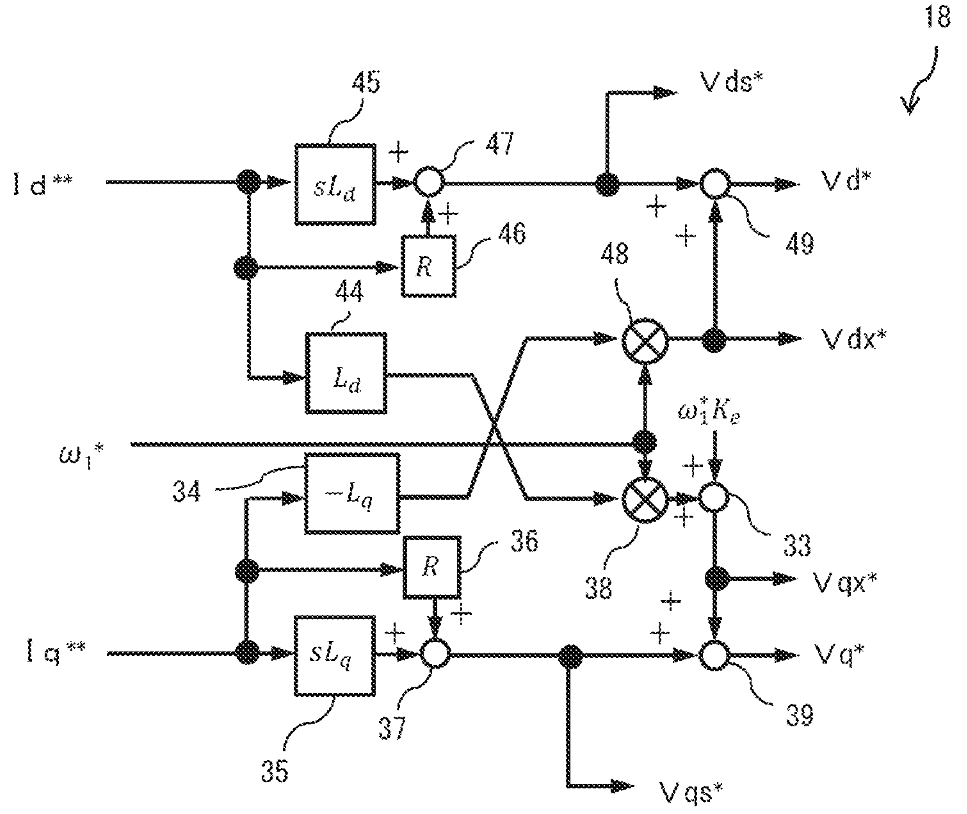
FIG. 5 is a configuration diagram of a voltage vector computation unit according to the first embodiment.

FIG. 5 is a configuration diagram of the voltage vector computation unit 18.

The voltage vector computation unit 18 is configured based on an inverse model of a motor model shown in Expression (1).

[Expression 1]

$$\begin{bmatrix} V_d^* \\ V_q^* \end{bmatrix} = \begin{bmatrix} R + sL_d & -\omega_1^* L_q \\ \omega_1^* L_d & R + sL_q \end{bmatrix} \begin{bmatrix} I_d^{} \\ I_q^{} \end{bmatrix} + \begin{bmatrix} 0 \\ \omega_1^* K_e \end{bmatrix} \quad (1)$$

In Expression (1), Ld is d-axis inductance, Lq is q-axis inductance, R is winding resistance, s is a differential operator, and Ke is a speed electromotive force coefficient.

As illustrated in FIG. 5, the voltage vector computation unit 18 receives the second d-axis current command value Id, the second q-axis current command value Iq, and the speed information ω1*, and outputs the d-axis voltage command value Vd*, the q-axis voltage command value Vq*, the d-axis coaxial voltage command value Vds*, the q-axis coaxial voltage command value Vqs*, the d-axis orthogonal voltage command value Vdx*, and the q-axis orthogonal voltage command value Vqx*.

As illustrated in FIG. 5, a result of multiplication of the second d-axis current command value Id and winding resistance 46 is input to one side of an adder 47. A multiplication result 45 of the second d-axis current command value Id and "the differential operator s×d-axis inductance Ld" is input to the other of the adders 47. An addition result of both input to the adder 47 is output as the d-axis coaxial voltage command value Vds* and input to one side of an adder 49.

A multiplication result of the second q-axis current command value Iq and winding resistance 36 is input to one side of an adder 37. A multiplication result 35 of the second q-axis current command value Iq and "(the differential operator s)×(q-axis inductance Lq)" is input to the other side of the adder 37. An addition result of both input to the adder 37 is output as the q-axis coaxial voltage command value Vqs* and input to one side of an adder 39.

A multiplication result 44 of the second d-axis current command value Id and the d-axis inductance Ld is input to one side of a multiplier 38 and is multiplied by the speed information ω1* input to the other side thereof. A result of the multiplication is added to "the speed information ω1*×a speed electromotive force coefficient Ke" by an adder 33** and is output as the q-axis orthogonal axis voltage command value Vqx*. The q-axis orthogonal axis voltage command value Vqx* is added to the q-axis coaxial voltage command value Vqs* by the adder 39 and is output as the q-axis voltage command value Vq*.

A multiplication result 34 of the second q-axis current command value Iq and the negative q-axis inductance Lq is input to one side of a multiplier 48 and is multiplied by the speed information ω1*** input to the other side thereof. The multiplication result is output as the d-axis orthogonal axis voltage command value Vdx*. The d-axis orthogonal axis voltage command value Vdx* is added to the d-axis coaxial voltage command value Vds* by the adder 49, and is output as the d-axis voltage command value Vd*.

Figure 6:
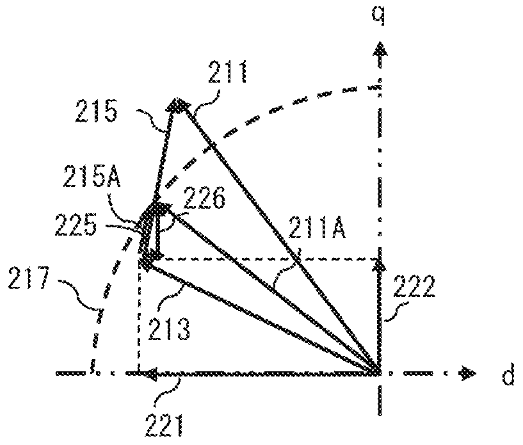
FIG. 6 is a diagram illustrating voltage vectors by dq-axis coordinates with an orthogonal axis voltage vector equal to or smaller than a voltage limit value in the first embodiment.

FIG. 6 is a diagram illustrating voltage vectors in the present embodiment in dq-axis coordinates. The voltage vectors are illustrated in which an orthogonal axis voltage vector (orthogonal component) is equal to or smaller than a voltage limit value. The voltage vectors are divided into a coaxial voltage vector (coaxial component) 215 acting coaxially and an orthogonal axis voltage vector (orthogonal component) 213 acting on an orthogonal axis.

As illustrated in FIG. 6, the voltage limitation unit 28 allows the voltage vector 211 to have an amplitude within the voltage limit value 217, the voltage vector 211 being a combination of the coaxial voltage vector 215 and the orthogonal axis voltage vector 213, by limiting the coaxial voltage vector (coaxial component) 215 by prioritizing the orthogonal axis voltage vector (orthogonal component) 213. As a result, the coaxial voltage vector (coaxial component) 215 is limited to a coaxial voltage vector (coaxial component) 215A. This limitation causes the voltage vector 211 to become a voltage vector 211A, thereby falling within the voltage limit value 217. The orthogonal component corresponds to a non-interference term, so that maintaining the orthogonal component enables suppressing fluctuation of a fundamental frequency due to inter-axis interference of the motor 1.

Figure 7:
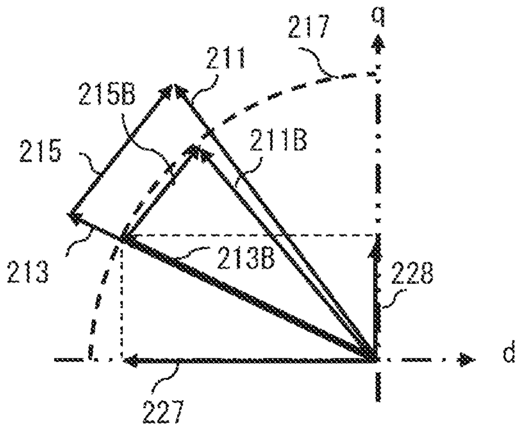
FIG. 7 is a diagram illustrating voltage vectors by dq-axis coordinates with an orthogonal axis voltage vector more than the voltage limit value in the first embodiment.

FIG. 7 is a diagram illustrating voltage vectors in the present embodiment in dq-axis coordinates. The voltage vectors are illustrated in which an orthogonal axis voltage vector (orthogonal component) is larger than the voltage limit value.

As illustrated in FIG. 7, the orthogonal component 213 larger than the voltage limit value 217 is reduced in amplitude while being maintained in direction to become an orthogonal component 213B. Then, the coaxial voltage vector (coaxial component) 215 is limited to a coaxial voltage vector (coaxial component) 215B by prioritizing the orthogonal axis voltage vector (orthogonal component) 213B to allow the voltage vector 211 to have an amplitude within the voltage limit t value 217. This limitation enables reducing a non-interference component.

Figure 8:
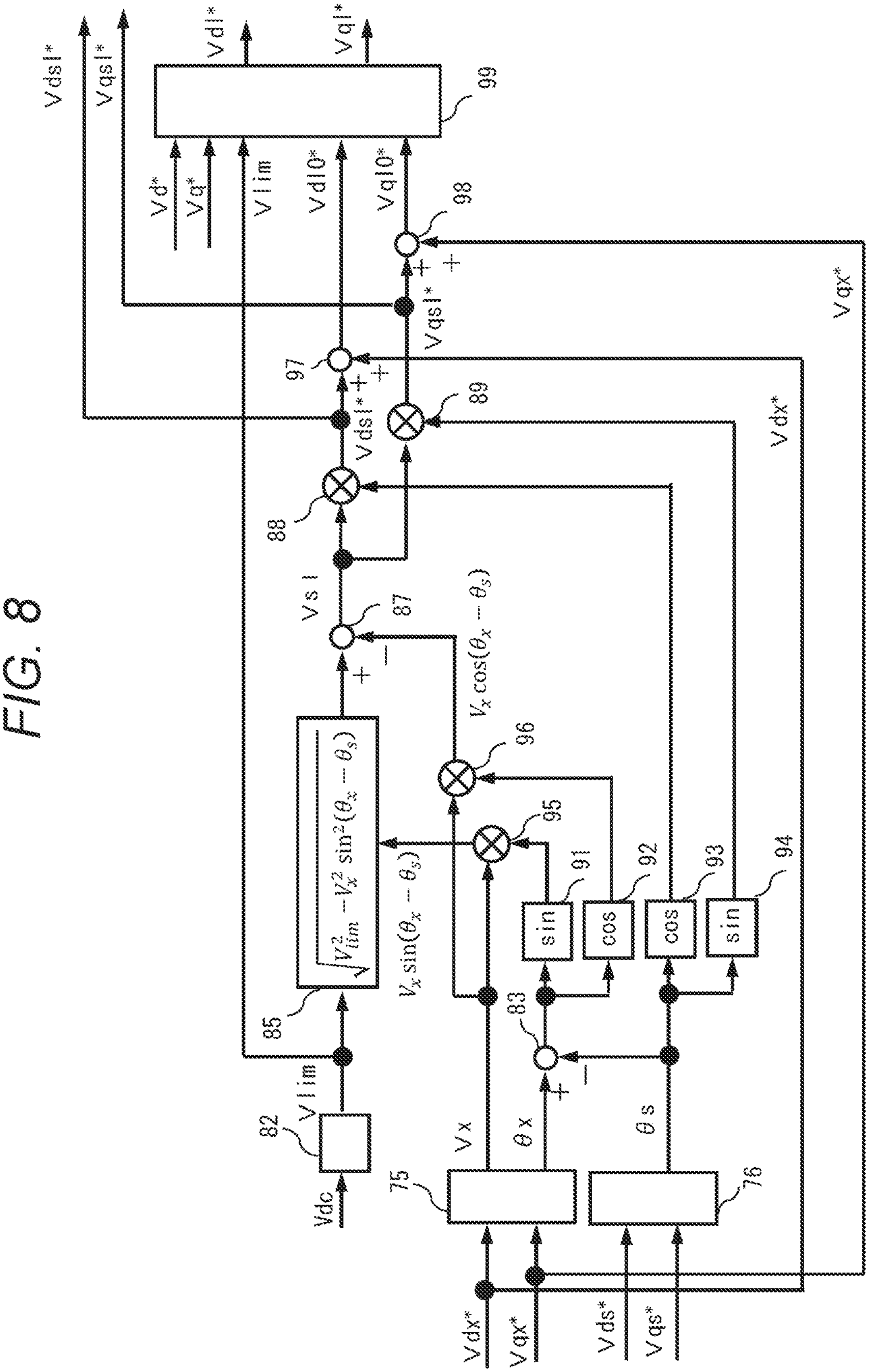
FIG. 8 is a configuration diagram of a voltage limitation unit according to Example 1 in the first embodiment.

FIG. 8 is a configuration diagram of the voltage limitation unit 28 according to Example 1. Example 1 is applied under conditions where the orthogonal axis voltage vector (orthogonal component) shown in FIG. 6 is smaller than or equal to the voltage limit value. The motor 1 always satisfying the conditions enables the configuration shown in Example 1 to be used.

When the voltage vector 211A after the limitation of voltage has an amplitude of Vlim in FIG. 6, Expression (2) below holds.

[Expression 2]

$$V_{lim}^2 = (V_{dx}^* + V_{dist}^*)^2 + (V_{qx}^* + V_{qsl}^*) \quad (2)$$

In Expression (2), Vdx* represents a d-axis orthogonal axis voltage command value 221, and Vqx* represents a q-axis orthogonal axis voltage command value 222. Additionally, Vdsl* represents a d-axis coaxial voltage command value 225 after the limitation of voltage, and Vqsl* represents a q-axis coaxial voltage command value 226 after the limitation of voltage.

Here, when an amplitude Vx and a phase angle θx of the orthogonal axis voltage vector 213 and an amplitude Vsl and a phase angle θs (the phase angle θs of the coaxial voltage vector 215 is equivalent to a phase angle θsl of a coaxial voltage vector 215A, so that the phase angle θsl is expressed as the phase angle θs) of the coaxial voltage vector 215A after the limitation of voltage are used, Expression (2) is transformed into Expression (3).

[Expression 3]

$$V_{lim}^2 = (V_x\cos\theta_x + V_{sl}\cos\theta_s)^2 + (V_x\sin\theta_x + V_{sl}\sin\theta_s)^2 \quad (3)$$

Expression (3) is transformed into Expression (4).

[Expression 4]

$$V_{lim}^2 = V_x^2 + V_{sl}^2 + 2V_xV_{sl}\cos(\theta_x - \theta_s) \quad (4)$$

Expression (4) is transformed into Expression (5) to acquire the amplitude Vsl of the coaxial voltage vector 215A.

[Expression 5]

$$V_{sl} = -V_x\cos(\theta_x - \theta_s) + \sqrt{V_{lim}^2 - V_x^2\sin^2(\theta_x - \theta_s)} \quad (5)$$

The voltage limitation unit 28 illustrated in FIG. 8 performs the limitation of voltage illustrated in FIG. 6 based on Expression (5).

First, an amplitude and phase angle computation unit 75 calculates the amplitude Vx and the phase angle θx of the orthogonal axis voltage vector 213. The phase angle θs of the coaxial voltage vector 215 is further calculated using an amplitude and phase angle computation unit 76.

The amplitude and phase angle computation unit 75 calculates the amplitude Vx of the orthogonal axis voltage vector 213 according to Expression (6) based on the d-axis orthogonal axis voltage command value Vdx* and the q-axis orthogonal axis voltage command value Vqx*, having been received.

[Expression 6]

$$V_x = \sqrt{V_{dx}^{*2} + V_{qx}^{*2}} \quad (6)$$

The amplitude and phase angle computation unit 75 calculates the phase angle θ* of the orthogonal axis voltage vector 213 according to Expression (7) based on the d-axis orthogonal axis voltage command value Vdx* and the q-axis orthogonal axis voltage command value Vqx*, having been received.

[Expression 7]

$$\theta_x = \tan^{-1}\frac{V_{qx}^*}{V_{dx}^*} \quad (7)$$

The amplitude and phase angle computation unit 76 calculates the phase angle θs of the coaxial voltage vector 215 according to Expression (8) based on the d-axis coaxial voltage command value Vds* and the q-axis coaxial voltage command value Vqs*, having been received.

[Expression 8]

$$\theta_s = \tan^{-1}\frac{V_{qs}^*}{V_{ds}^*} \quad (8)$$

A limit value computation unit 82 calculates a voltage limit value Vlim according to Expression (9) based on inverter DC voltage Vdc.

[Expression 9]

$$V_{lim} = \frac{V_{dc}}{\sqrt{2}} \quad (9)$$

The voltage limit value Vlim is set to a voltage to be limited regardless of Expression (9) by giving a margin of several percent to the value of Expression (9), or increasing the voltage limit value Vlim by several percent to use an overmodulation region, for example.

Based on the Vx, θx, θs, and Vlim calculated according to Expressions (6) to (9), the amplitude Vsl of the coaxial voltage vector 215A is acquired by a circuit below that implements Expression (5).

The circuit implementing Expression (5) includes a subtractor 83, a sine wave generator 91, a cosine wave generator 92, multipliers 95 and 96, a square root difference computation unit 85, and a subtractor 87 illustrated in FIG. 8. The subtractor 83 calculates "θx−θs", and outputs the "θx−θs" to the sine wave generator 91 and the cosine wave generator 92. The multiplier 95 multiplies the output of the sine wave generator 91 by the Vx and outputs a result of the multiplication to the square root difference computation unit 85. The square root difference computation unit 85 calculates a square root difference and outputs the square root difference to the subtractor 87. The multiplier 96 multiplies the output of the cosine wave generator 92 by the Vx and outputs a result of the multiplication to the subtractor 87. The subtractor 87 subtracts a result of calculation of the subtractor 87 from a result of calculation of the square root difference computation unit 85 to acquire the Vsl expressed in Expression (5).

Then, a multiplier 88 multiplies the Vsl by a result of calculation of a cosine wave generator 93 to calculate the d-axis coaxial voltage Vdsl* after the limitation of voltage. A multiplier 89 multiplies the Vsl by a result of calculation of a sine wave generator 94 to calculate the q-axis coaxial voltage Vqsl* after the limitation of voltage.

An adder 97 adds the Vdx* to the Vdsl* to calculate the d-axis voltage command value Vdl0* after the limitation of voltage. An adder 98 adds the Vqx* to the Vqsl* to calculate the q-axis voltage command value Vql0* after the limitation of voltage.

Finally, a voltage selector 99 outputs directly the Vd* and the Vq* as the d-axis voltage command value Vdl* and the q-axis voltage command value Vql*, respectively, when a voltage amplitude is equal to or smaller than the voltage limit value Vlim, and outputs the values Vdl0 and Vql0 after the limitation as the d-axis voltage command value Vdl* and the q-axis voltage command value Vql*, respectively, when the voltage amplitude is larger than the voltage limit value Vlim. The d-axis coaxial voltage Vdsl* after the limitation of voltage and the q-axis coaxial voltage Vqsl* after the limitation of voltage are output to the correction amount calculation unit 26.

Figure 9:
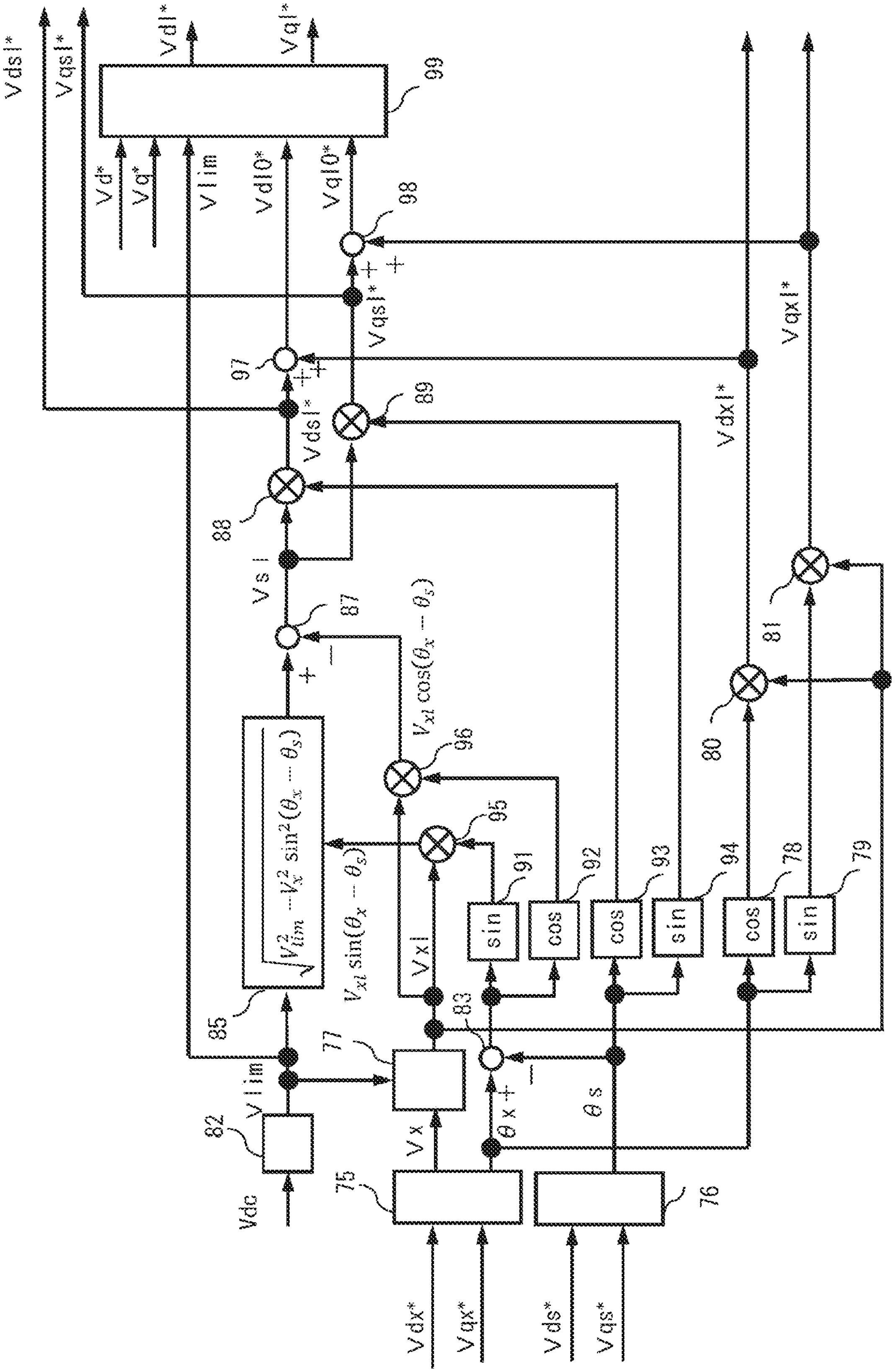
FIG. 9 is a configuration diagram of a voltage limitation unit according to Example 2 in the first embodiment.

FIG. 9 is a configuration diagram of the voltage limitation unit 28 according to Example 2. Example 2 is a configuration applicable even under conditions where the orthogonal axis voltage vector (orthogonal component) illustrated in FIG. 7 is larger than a voltage limit. The same parts as those in Example 1 illustrated in FIG. 8 are denoted by the same reference numerals to simplify description.

As illustrated in FIG. 7, the combined vector 213B after the limitation of voltage has an amplitude in the same direction (the same voltage phase angle) as the orthogonal axis voltage vector 213, the amplitude being only limited. Thus, a limitation unit 77 limits the Vx to the Vlim and outputs a Vxl. The square root difference computation unit 85 calculates the Vsl by using the Vxl instead of the Vx in Expression (5) and outputs the Vsl to the subtractor 87. When the Vsl is calculated using the Vxl instead of the Vx according to Expression (5), the Vsl is always zero.

A cosine wave generator 78 receives the phase angle θx of the orthogonal axis voltage vector 213. A multiplier 80 multiplies output of the cosine wave generator 78 by the Vxl after limitation and outputs a result of the multiplication as the d-axis orthogonal axis voltage Vdxl*. A sine wave generator 79 receives the phase angle θx of the orthogonal axis voltage vector 213. A multiplier 81 multiplies output of the sine wave generator 79 by the Vxl after the limitation and outputs a result of the multiplication as the q-axis orthogonal axis voltage Vqxl*.

The adder 97 adds the Vdxl* to the Vdsl* to calculate the d-axis voltage command value Vdl0* after the limitation of voltage. The adder 98 adds the Vqxl* to the Vqsl* to calculate the q-axis voltage command value Vql0* after the limitation of voltage.

Finally, a voltage selector 99 outputs directly the Vd* and the Vq* as the d-axis voltage command value Vdl* and the q-axis voltage command value Vql*, respectively, when a voltage amplitude is equal to or smaller than the voltage limit value Vlim, and outputs the values Vdl0* and Vql0* after the limitation as the d-axis voltage command value Vdl* and the q-axis voltage command value Vql*, respectively, when the voltage amplitude is larger than the voltage limit value Vlim. The d-axis coaxial voltage Vdsl* after the limitation of voltage, a q-axis coaxial voltage Vqsl* after the limitation of voltage, a d-axis orthogonal axis voltage Vdxl*, and a q-axis orthogonal axis voltage Vqxl* are output to the correction amount calculation unit 26. As a result, the voltage limitation unit 28 of Example 2 illustrated in FIG. 9 is applicable under conditions where the orthogonal axis voltage vector (orthogonal component) illustrated in FIG. 7 is larger than the voltage limit and conditions where the orthogonal axis voltage vector (orthogonal component) illustrated in FIG. 6 is equal to or smaller than the voltage limit value Vlim.

Figure 10:
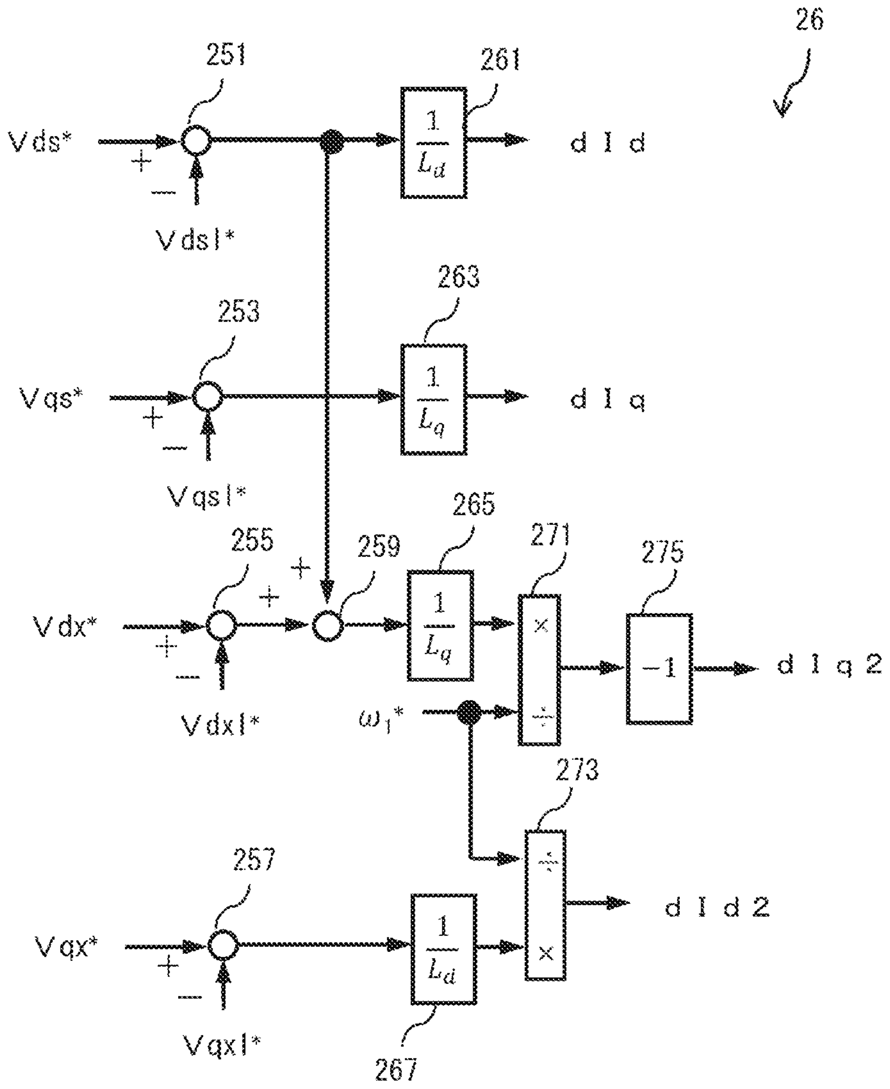
FIG. 10 is a configuration diagram of a correction amount calculation unit according to a second embodiment.

FIG. 10 is a configuration diagram of the correction amount calculation unit 26. The correction amount calculation unit 26 is connected to the voltage limitation unit 28 of Example 2 illustrated in FIG. 9.

As illustrated in FIG. 10, a subtractor 251 subtracts the d-axis coaxial voltage Vdsl* output from the voltage limitation unit 28 from the d-axis coaxial voltage command value Vds* output from the voltage vector computation unit 18. A result of the subtraction is an excess of voltage exceeding the voltage limit value Vlim. The result of the subtraction is divided by the d-axis inductance Ld with a gain 261, and is output to the second dq-axis current command computation unit 24 as the amount dId of correction of a current command value. A subtractor 253 subtracts the q-axis coaxial voltage Vqsl* output from the voltage limitation unit 28 from the q-axis coaxial voltage command value Vqs* output from the voltage vector computation unit 18. A result of the subtraction is divided by the q-axis inductance Lq with a gain 263 and is output to the second dq-axis current command computation unit 24 as the amount dIq of correction of a current command value. The amounts dId and dIq of correction of current command values each represent an excess of voltage exceeding the voltage limit value when the dq-axis coaxial voltage is limited by the limitation of voltage.

When the correction amount calculation unit 26 is connected to the voltage limitation unit 28 of Example 1 illustrated in FIG. 8, the correction amount calculation unit 26 may be configured to output the amounts dId and dIq of correction of current command values described above. Hereinafter, this case will be described.

The coaxial component of the voltage vector is mainly voltage for changing a current, and thus limitation of the coaxial component causes the current not to be changed. The integrators 53 and 63 in the corresponding proportional-integral controllers 50 and 60 of the second dq-axis current command computation unit 24 illustrated in FIG. 4 operate on the assumption that the current changes with an integral gain KI, and thus cause a difference between the second current command value and the current when voltage is limited. To prevent the difference, subtractors 52 and 62 respectively subtract the amounts dId and dIq of correction of current command values, the amounts being not changed with a change of voltage due to limitation. Specifically, the second dq-axis current command computation unit 24 corrects the integrator 53 coaxially applied to the proportional-integral control based on the amount dId of correction of a current command value, the amount corresponding to an excess of the coaxial component in an excess of voltage exceeding the voltage limit value Vlim due to the limitation of voltage. The second dq-axis current command computation unit 24 further corrects the integrator 63 applied to the orthogonal axis of the proportional-integral control based on the amount dIq of correction of a current command value, the amount corresponding to an excess of an orthogonal axis component in an excess of voltage exceeding the voltage limit value Vlim due to the limitation of voltage. As a result, the voltage limit value Vlim prevents a difference from being generated between the second current command value and the current.

The description returns to FIG. 10. A subtractor 255 subtracts the d-axis orthogonal axis voltage Vdxl* output from the voltage limitation unit 28 from the d-axis orthogonal axis voltage command value Vdx* output from the voltage vector computation unit 18. A result of the subtraction is input to one side of an adder 259. A result of subtraction of the d-axis coaxial voltage Vdsl* from the d-axis coaxial voltage command value Vds* is input to the other side of the adder 259. Then, the results are added by the adder 259. A result of the addition is divided by the q-axis inductance Lq with a gain 265, and is divided by a divider 271 using the speed information ω1* and inverted with a gain 275 to be output as the amount dIq2 of correction of a current command value. The dIq2 is inverted in sign, so that the sign is inverted with the gain 275. As a result, the amount dIq2 of correction of a current command value is acquired, the amount corresponding to an excess of voltage in the coaxial direction of the d-axis in an excess of the voltage exceeding the voltage limit value.

Then, a subtractor 257 subtracts the q-axis orthogonal axis voltage Vqxl* output from the voltage limitation unit 28 from the q-axis orthogonal axis voltage command value Vqx* output from the voltage vector computation unit 18. A result of the subtraction is divided by the d-axis inductance Ld with a gain 267 and divided by a divider 273 using the speed information ω1*, and a result of the division is output as the amount dId2 of correction of a current command value.

As illustrated in FIG. 7, the correction amount calculation unit 26 connected to the voltage limitation unit 28 of Example 2 illustrated in FIG. 9 needs to reduce the orthogonal axis component when the orthogonal axis component exceeds the voltage limit value. However, current control is not effective only by reducing an amplitude of the orthogonal axis component while maintaining a direction thereof. When the orthogonal axis component is restricted by the voltage limit value, the voltage vector needs to be reduced by causing a weak magnetic flux current to flow. Thus, the proportional-integral control on a d-axis side needs to be maintained. A value acquired by subtracting the d-axis coaxial voltage Vdsl* from the d-axis coaxial voltage command value Vds* using the subtractor 251 is an excess of voltage exceeding the voltage limit value in the coaxial direction of the d-axis. That is, the amount dId2 of correction of a current command value includes an excess of a coaxial component of the d-axis. The proportional-integral controller 60 of the second dq-axis current command computation unit 24 illustrated in FIG. 4 subtracts the amount dIq2 of correction of a current command from the integrator 63. That is, the second dq-axis current command computation unit 24 corrects the integrator 63 applied to the q-axis based on the amount of correction of a current command value, the amount corresponding to an excess of voltage in the coaxial direction of the d-axis in an excess of the voltage.

As a result, the second dq-axis current command computation unit 24 provides a margin that enables d-axis current control to be maintained in consideration of the coaxial component on the d-axis side. As illustrated in FIG. 7, the orthogonal axis component exceeds the voltage limit value when the motor 1 rapidly increases in speed or when the DC voltage source 9 rapidly decreases in voltage, specifically when the speed rapidly increases due to idling as in an electric vehicle such as an electric automobile. As described above, even when the orthogonal axis component exceeds the voltage limit value, the current control can be prevented from becoming ineffective by causing weak magnetic flux control to work.

The present embodiment enables implementing stable current control even near a voltage limit when a voltage command value based on a current command value is limited.

Second Embodiment

Figure 11:
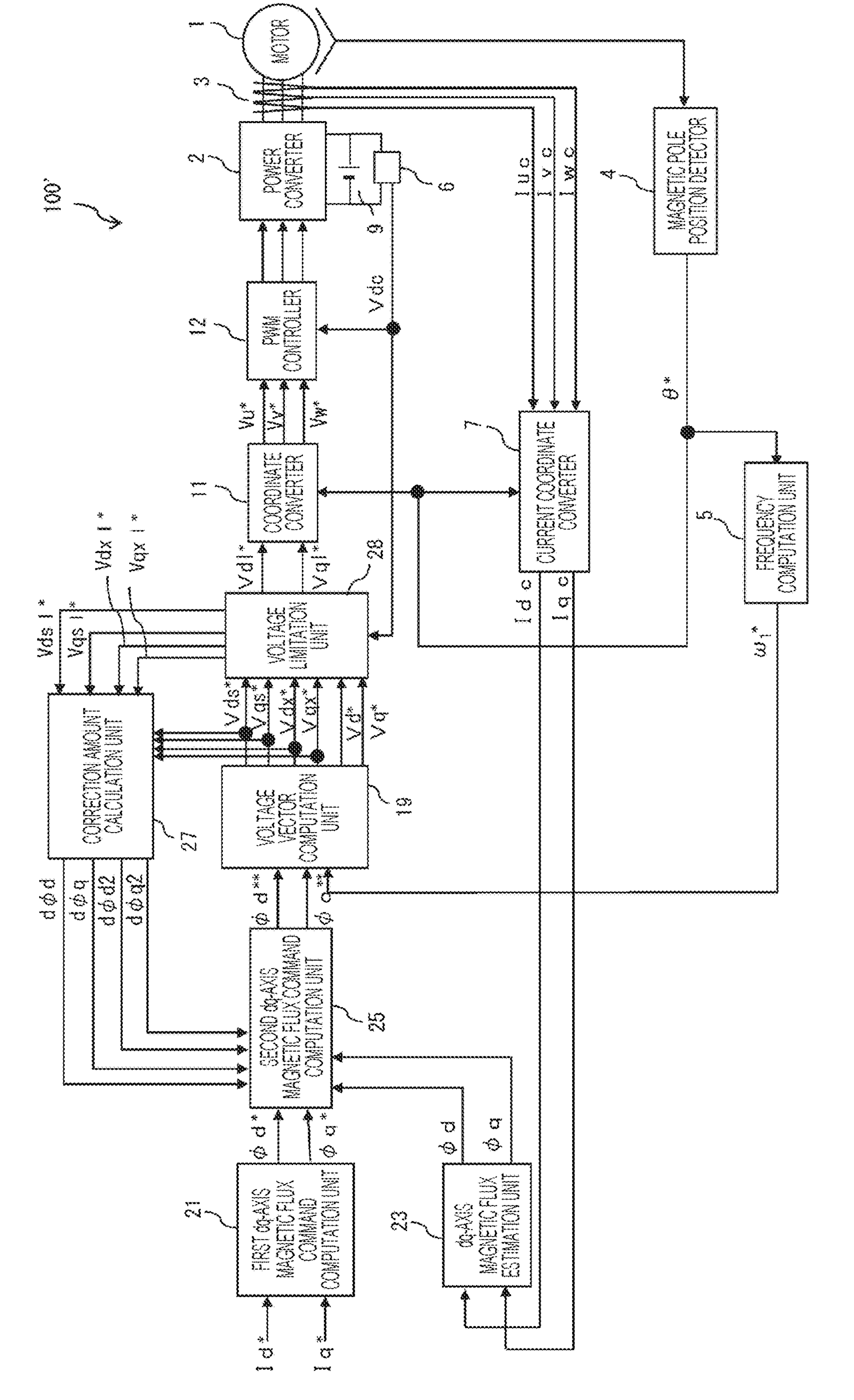
FIG. 11 is a block diagram of a synchronous machine control device according to a second embodiment.

FIG. 11 is a block diagram of a synchronous machine control device 100' according to a second embodiment of the present invention. Although the first embodiment describes an example in which the voltage command value based on the current command value is limited, the second embodiment will describe an example in which a voltage command value based on a magnetic flux command value is limited. The same parts as those of the synchronous machine control device 100 in the first embodiment illustrated in FIG. 3 are denoted by the same reference numerals to simplify description thereof.

As illustrated in FIG. 11, the synchronous machine control device 100' includes a power converter 2, a phase current detector 3, a magnetic pole position detector 4, a frequency computation unit 5, a current coordinate converter 7, a first dq-axis magnetic flux command computation unit 21, a dq-axis magnetic flux estimation unit 23, a second dq-axis magnetic flux command computation unit 25, a correction amount calculation unit 27, and a voltage limitation unit 28.

The dq-axis magnetic flux estimation unit 23 uses a d-axis detection value Idc and a q-axis detection value Iqc output from the current coordinate converter 7 to estimate a d-axis magnetic flux estimation value φd and a q-axis magnetic flux estimation value φq with reference to a lookup table, for example. The first dq-axis magnetic flux command computation unit 21 uses a d-axis current command value Id* and a q-axis current command value Iq* to output a first d-axis magnetic flux command value φd* and a first q-axis magnetic flux command value φq* with reference to a lookup table, for example.

The second dq-axis magnetic flux command computation unit 25 outputs a second d-axis magnetic flux command value φd and a second q-axis magnetic flux command value φq by proportional-integral control to allow the first d-axis magnetic flux command value φd* and the first q-axis magnetic flux command value φq* to coincide with the d-axis magnetic flux estimated value φd and the q-axis magnetic flux estimated value φq, respectively. The second dq-axis magnetic flux command computation unit 25 further receives the amounts dφd, dφq, dφd2, and dφq2 of correction of a magnetic flux command value from the correction amount calculation unit 27 to use the amounts for anti-windup control. Details will be described later.

A voltage vector computation unit 19 outputs a d-axis voltage command value Vd*, a q-axis voltage command value Vq*, a d-axis coaxial voltage command value Vds*, a q-axis coaxial voltage command value Vqs*, a d-axis orthogonal axis voltage command value Vdx*, and a q-axis orthogonal axis voltage command value Vqx* to the voltage limitation unit 28 based on the second d-axis magnetic flux command value φd, the second q-axis magnetic flux command value φq, and speed information ω1*. Additionally, the d-axis coaxial voltage command value Vds*, the q-axis coaxial voltage command value Vqs*, the d-axis orthogonal axis voltage command value Vdx*, and the q-axis orthogonal axis voltage command value Vqx* are output to the correction amount calculation unit 27. That is, the voltage vector computation unit 19 generates a coaxial voltage command value and an orthogonal axis voltage command value based on a second magnetic flux command value generated by the second dq-axis magnetic flux command computation unit 25.

The voltage limitation unit 28 receives the d-axis voltage command value Vd*, the q-axis voltage command value Vq*, the d-axis coaxial voltage command value Vds*, the q-axis coaxial voltage command value Vqs*, the d-axis orthogonal axis voltage command value Vdx*, the q-axis orthogonal axis voltage command value Vqx*, and the DC voltage information Vdc from the DC voltage detector 6, and the d-axis voltage command value Vd* and the q-axis voltage command value Vq* are subjected to the limitation of voltage. Then, a d-axis voltage command value Vdl* and a q-axis voltage command value Vql* are output to a coordinate converter 11. A d-axis coaxial voltage Vdsl* after the limitation of voltage, a q-axis coaxial voltage Vqsl* after the limitation of voltage, a d-axis orthogonal axis voltage Vdxl*, and a q-axis orthogonal axis voltage Vqxl* are output to the correction amount calculation unit 27. The voltage limitation unit 28 limits the coaxial voltage command value in preference to the orthogonal axis voltage command value to prevent the voltage command value from exceeding a predetermined voltage limit value. The voltage limitation unit 28 has a detailed configuration similar to the configuration illustrated in FIGS. 9 and 10, and thus the detailed configuration will not be illustrated.

The correction amount calculation unit 27 receives the d-axis coaxial voltage command value Vds*, the q-axis coaxial voltage command value Vqs*, the d-axis orthogonal axis voltage command value Vdx*, and the q-axis orthogonal axis voltage command value Vqx* from the voltage vector computation unit 19, and receives the d-axis coaxial voltage Vdsl*, the q-axis coaxial voltage Vqsl*, the d-axis orthogonal axis voltage Vdxl*, and the q-axis orthogonal axis voltage Vqxl* from the voltage limitation unit 28. Then, the second dq-axis magnetic flux command computation unit 25 calculates the amounts dφd, dφq, dφd2, and dφq2 of correction of magnetic flux command values for implementing the anti-windup control. That is, the correction amount calculation unit 27 calculates the amount of correction of a magnetic flux command value for correcting the magnetic flux command value based on the limitation determined by the voltage limitation unit 28. Details will be described later.

The coordinate converter 11 performs coordinate transformation on the d-axis voltage command value Vdl* and the q-axis voltage command value Vql* output by the voltage limitation unit 28 using the magnetic pole position information θ* detected by the magnetic pole position detector 4 to output three-phase voltage command values Vu*, Vv*, and Vw*. A PWM controller 12 performs, for example, triangular wave comparison using the three-phase voltage command values Vu*, Vv*, and Vw* and the DC voltage information Vdc on the DC voltage source 9 detected by the DC voltage detector 6, and outputs the gate signal to the power converter 2.

Figure 12:
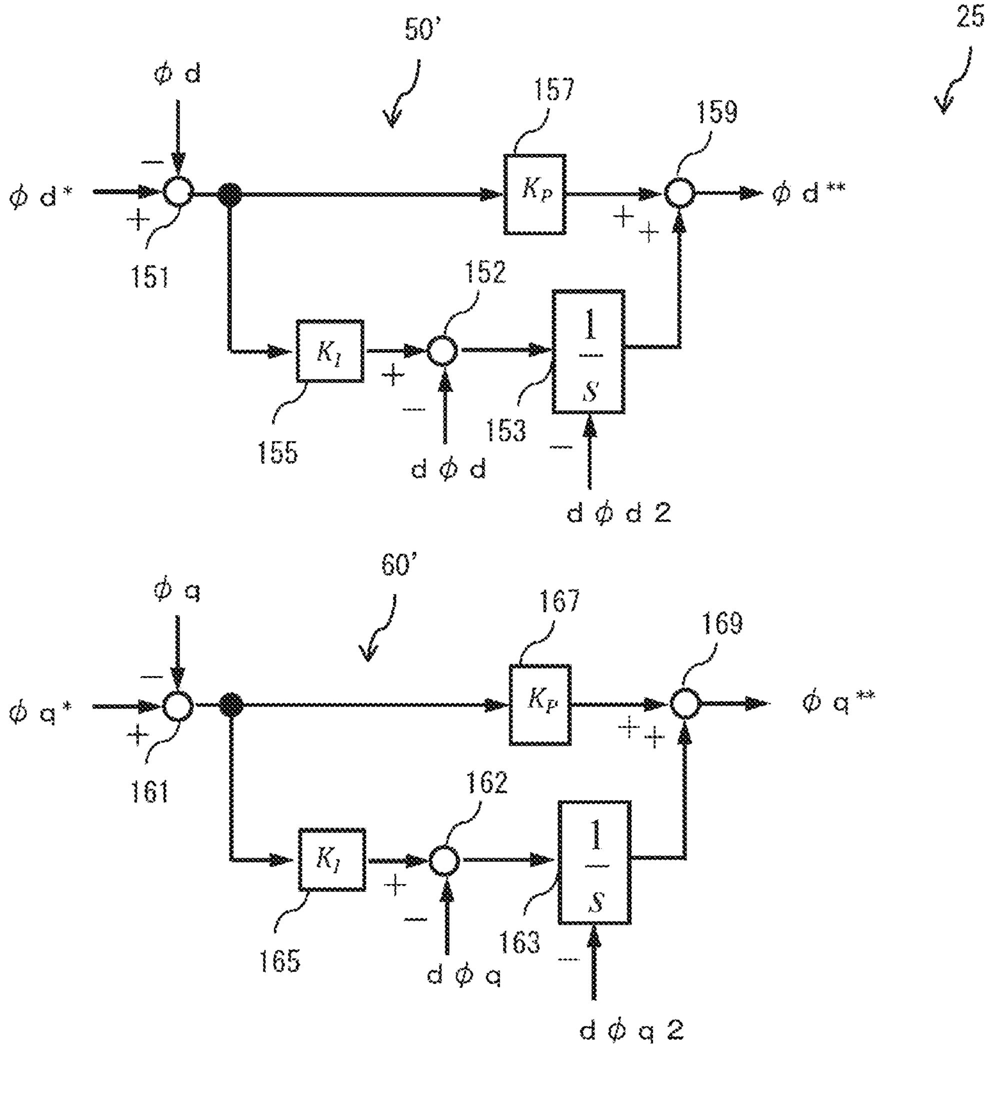
FIG. 12 is a configuration diagram of a second dq-axis magnetic flux command computation unit according to the second embodiment.

FIG. 12 is a configuration diagram of the second dq-axis magnetic flux command computation unit 25.

The second dq-axis magnetic flux command computation unit 25 includes a proportional-integral controller 50' that receives the first d-axis magnetic flux command value φd* is input and a proportional-integral controller 60' that receives the first q-axis magnetic flux command value φq*.

The proportional-integral controller 50' of the second dq-axis magnetic flux command computation unit 25 corrects the first d-axis magnetic flux command value φd* by the proportional-integral control based on the amounts dφd and dφd2 of correction of magnetic flux command values, and outputs the second d-axis magnetic flux command value φd. Specifically, a subtractor 151** subtracts the d-axis magnetic flux estimation value φd from the first d-axis magnetic flux command value φd*. A result of the subtraction is input to one side of an adder 159 through a proportional control gain 157. The result of the subtraction using the subtractor 151 is input to an integrator 153 after the amount dφd of correction of a magnetic flux command value is subtracted from output of an integration control gain 155 using a subtractor 152. The integrator 153 subtracts the amount dφd2 of correction of a magnetic flux command value from the integrator 153 and inputs a result of the subtraction to the other side of the adder 159. A result of the addition of the adder 159 is output as the second d-axis magnetic flux command value φd**.

The proportional-integral controller 60' of the second dq-axis magnetic flux command computation unit 25 corrects the first q-axis magnetic flux command value φq* by the proportional-integral control based on the amounts dφq and dφq2 of correction of magnetic flux command values, and outputs the second d-axis magnetic flux command value φq. Specifically, a subtractor 161** subtracts the q-axis magnetic flux estimation value φq from the first q-axis magnetic flux command value φq*. A result of the subtraction is input to one side of an adder 169 through a proportional control gain 167. The result of the subtraction using the subtractor 161 is input to an integrator 163 after the amount dφq of correction of a magnetic flux command value is subtracted from output of an integration control gain 165 using a subtractor 162. The integrator 163 subtracts the amount dφq2 of correction of a magnetic flux command value from the integrator 163 and inputs a result of the subtraction to the other side of the adder 169. A result of the addition of the adder 169 is output as the second q-axis magnetic flux command value φq**.

Figure 13:
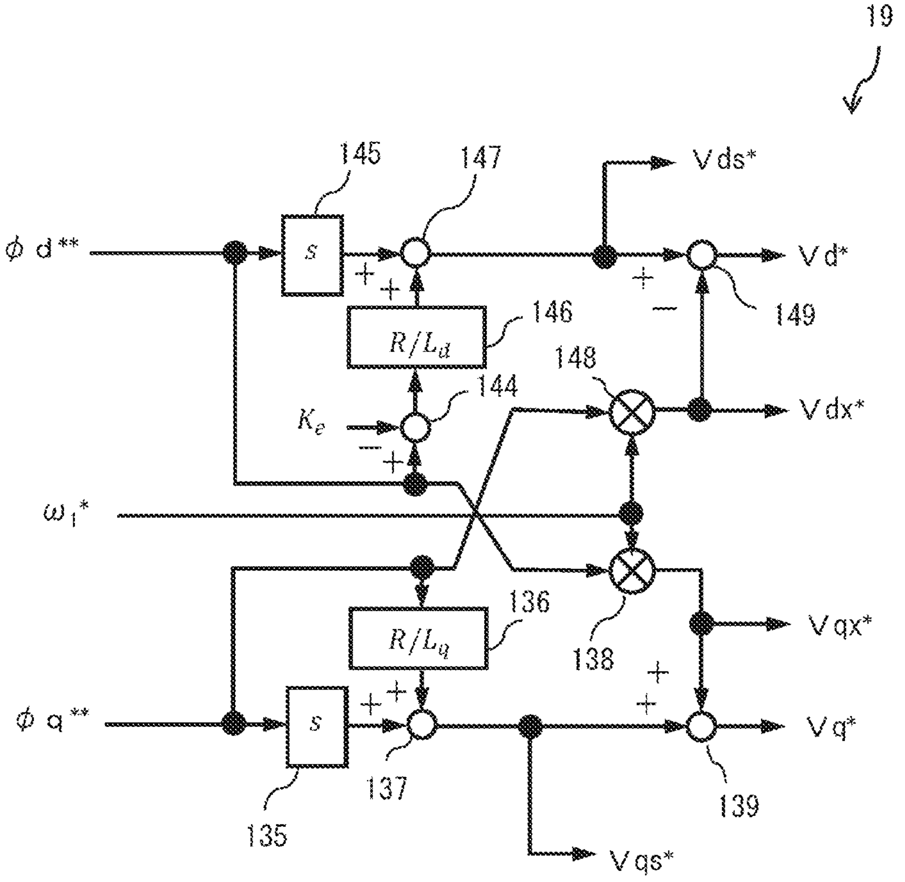
FIG. 13 is a configuration diagram of a voltage vector computation unit according to the second embodiment.

FIG. 13 is a configuration diagram of the voltage vector computation unit 19.

The voltage vector computation unit 19 is configured based on an inverse model of a motor model shown in Expression (10).

[Expression 10]

$$\begin{bmatrix} V_d^* \\ V_q^* \end{bmatrix} = \begin{bmatrix} \frac{R}{L_d} & 0 \\ 0 & \frac{R}{L_q} \end{bmatrix} \begin{bmatrix} \phi_d^{} - K_e \\ \phi_q^{} \end{bmatrix} + s \begin{bmatrix} \phi_d^{} \\ \phi_q^{} \end{bmatrix} + \omega_1^* \begin{bmatrix} 0 & -1 \\ 1 & 0 \end{bmatrix} \begin{bmatrix} \phi_d^{} \\ \phi_q^{} \end{bmatrix} \tag{10}$$

In Expression (1), Ld is d-axis inductance, Lq is q-axis inductance, R is winding resistance, s is a differential operator, and Ke is a speed electromotive force coefficient.

As illustrated in FIG. 13, the voltage vector computation unit 19 receives the second d-axis magnetic flux command value φd, the second q-axis magnetic flux command value φq, and speed information ω1*, and outputs a d-axis voltage command value Vd*, a q-axis voltage command value Vq*, a d-axis coaxial voltage command value Vds*, a q-axis coaxial voltage command value Vqs*, a d-axis orthogonal axis voltage command value Vdx*, and a q-axis orthogonal axis voltage command value Vqx*.

As illustrated in FIG. 13, the second d-axis magnetic flux command value φd is multiplied by the differential operator s and is input to one side of an adder 147. The speed electromotive force coefficient Ke is subtracted from the second d-axis magnetic flux command value φd by a subtractor 144, and a result of the subtraction is multiplied by a value obtained by dividing winding resistance R by the d-axis inductance Ld and is input to the other side of the adder 147. A result of the addition using the adder 147 is output as the d-axis coaxial voltage command value Vds*. The second d-axis magnetic flux command value φd is multiplied by the speed information ω1* by a multiplier 138**, and a result of the multiplication is output as the q-axis orthogonal axis voltage command value Vqx*.

The second q-axis magnetic flux command value φq is multiplied by the differential operator s and is input to one side of an adder 137. The second q-axis magnetic flux command value φq is multiplied by a value obtained by dividing the winding resistance R by the q-axis inductance Lq and is input to the other side of the adder 137. A result of the addition using the adder 137 is output as the q-axis coaxial voltage command value Vqs*. The second q-axis magnetic flux command value φq is multiplied by the speed information ω1* by a multiplier 148**, and a result of the multiplication is output as the d-axis orthogonal axis voltage command value Vdx*.

The d-axis coaxial voltage command value Vds* is subtracted from the d-axis orthogonal axis voltage command value Vdx* by a subtractor 149, and is output as the d-axis voltage command value Vd*. The q-axis coaxial voltage command value Vqs* is added to the q-axis orthogonal axis voltage command value Vqx* by an adder 139 and output as the q-axis voltage command value Vq*.

Figure 14:
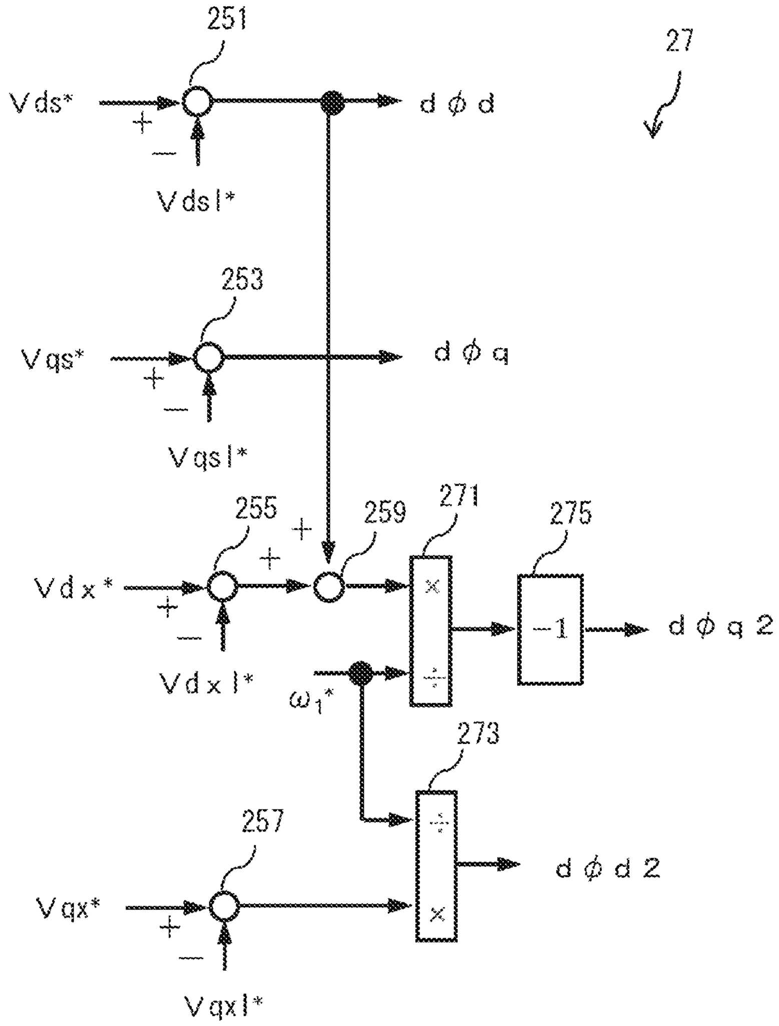
FIG. 14 is a configuration diagram of the correction amount calculation unit according to the second embodiment.

FIG. 14 is a configuration diagram of the correction amount calculation unit 27. The correction amount calculation unit 27 is connected to the voltage limitation unit 28 of Example 2 illustrated in FIG. 9.

As illustrated in FIG. 14, a subtractor 251 subtracts the d-axis coaxial voltage Vdsl* output from the voltage limitation unit 28 from the d-axis coaxial voltage command value Vds* output from the voltage vector computation unit 19. A result of the subtraction is an excess of voltage exceeding the voltage limit value Vlim. The result of the subtraction is output to the second dq-axis magnetic flux command computation unit 25 as the amount dφd of correction of a magnetic flux command value. The subtractor 253 subtracts the q-axis coaxial voltage Vqsl* output from the voltage limitation unit 28 from the q-axis coaxial voltage command value Vqs* output from the voltage vector computation unit 19. A result of the subtraction is output to the second dq-axis magnetic flux command computation unit 25 as the amount dφq of correction of a magnetic flux command value. The amounts dφd and dφq of correction of current command values each represent an excess of voltage exceeding the voltage limit value when the dq-axis coaxial voltage is limited by the limitation of voltage.

When the correction amount calculation unit 27 is connected to the voltage limitation unit 28 of Example 1 illustrated in FIG. 8, the correction amount calculation unit 27 may be configured to output the amounts dφd and dφq of correction of magnetic flux command values described above. Hereinafter, this case will be described.

The coaxial component of the voltage vector is mainly a voltage for changing a magnetic flux, and thus limitation of the coaxial component causes the magnetic flux not to be changed. The integrators 153 and 163 in the corresponding proportional-integral controllers 50' and 60' of the second dq-axis magnetic flux command computation unit 25 illustrated in FIG. 12 operate on the assumption that the magnetic flux changes with the integral gain Kl, and thus cause a difference between the second magnetic flux command value and the magnetic flux when voltage is limited. To prevent the difference, subtractors 152 and 162 respectively subtract the amounts dφd and dφg of correction of magnetic flux command values, the amounts being not changed with a change of voltage due to limitation. As a result, the voltage limit value Vlim prevents a difference from being generated between the second magnetic flux command value and the magnetic flux. In other words, the second dq-axis magnetic flux command computation unit 25 corrects the integrator 152 coaxially applied to the proportional-integral control based on the amount dφd of correction of a magnetic flux command value, the amount corresponding to an excess of the coaxial component in an excess of voltage exceeding the voltage limit value due to the limitation of voltage. The second dq-axis magnetic flux command computation unit 25 further corrects the integrator 162 applied to the orthogonal axis of the proportional-integral control based on the amount dφq of correction of a magnetic flux command value, the amount corresponding to an excess of the orthogonal axis component in an excess of voltage exceeding the voltage limit value due to the limitation of voltage. As a result, the voltage limit value Vlim prevents a difference from being generated between the second magnetic flux command value and the magnetic flux.

The description returns to FIG. 14. The subtractor 255 subtracts the d-axis orthogonal axis voltage Vdxl* output from the voltage limitation unit 28 from the d-axis orthogonal axis voltage command value Vdx* output from the voltage vector computation unit 19. A result of the subtraction is input to one side of an adder 259. A result of subtraction of the d-axis coaxial voltage Vdsl* from the d-axis coaxial voltage command value Vds* is input to the other side of the adder 259. Then, the results are added by the adder 259. A result of the addition is divided by the divider 271 using the speed information ω1* and inverted with the gain 275 to be output as the amount dφq2 of correction of a magnetic flux command value. The dφq2 is inverted in sign, so that the sign is inverted with the gain 275. As a result, the amount dφq2 of correction of a magnetic flux command value is acquired, the amount corresponding to an excess of voltage in the coaxial direction of the d-axis in the voltage exceeding the voltage limit value.

Then, the subtractor 257 subtracts the q-axis orthogonal axis voltage Vqxl* output from the voltage limitation unit 28 from the q-axis orthogonal axis voltage command value Vqx* output from the voltage vector computation unit 19. A result of the subtraction is divided by the divider 273 using the speed information ω1*, and a result of the division is output as the amount dφq2 of correction of a magnetic flux command value. The amounts dφd2 and dφq2 of correction of magnetic flux command values each represent influence caused by limitation of the orthogonal axis component.

As illustrated in FIG. 7, the correction amount calculation unit 27 connected to the voltage limitation unit 28 of Example 2 illustrated in FIG. 9 needs to reduce an orthogonal axis component when the orthogonal axis component exceeds the voltage limit value. However, magnetic flux control is not effective only by reducing an amplitude of the orthogonal axis component while maintaining a direction thereof. When the orthogonal axis component is restricted by the voltage limit value, the voltage vector needs to be reduced by causing a weak magnetic flux current to flow. Thus, the proportional-integral control on a d-axis side needs to be maintained. Thus, the amount dφq2 of correction of a magnetic flux command value is calculated by giving a margin to d-axis voltage using the adder 259 illustrated in FIG. 14, the margin enabling d-axis magnetic flux control to be maintained, in consideration of a coaxial component on the d-axis side. As specifically illustrated in FIG. 14, the d-axis orthogonal axis voltage command value Vdxl* and the q-axis orthogonal axis voltage command value Vqxl* after the limitation of voltage are subtracted from the d-axis orthogonal axis voltage command value Vdx* and the q-axis orthogonal axis voltage command value Vqx* by the subtractors 255 and 257, respectively, and the amount of a voltage limit value of a coaxial voltage command value is added only on the d-axis. As a result, even when the orthogonal axis component exceeds the voltage limit value illustrated in FIG. 7, the magnetic flux control can be prevented from becoming ineffective by causing weak magnetic flux control to work. The proportional-integral control unit 60' of the second dq-axis magnetic flux command computation unit 25 illustrated in FIG. 12 subtracts the amount dφq2 of correction of a magnetic flux command value from the integrator 163. That is, the second dq-axis magnetic flux command computation unit 25 corrects the integrator 163 applied to the q-axis based on the amount dφq2 of correction of a magnetic flux command value, the amount corresponding to an excess of voltage in the coaxial direction of the d-axis in the voltage exceeding.

As a result, the second dq-axis magnetic flux command computation unit 25 provides a margin that enables the d-axis magnetic flux control to be maintained in consideration of the coaxial component on the d-axis side. As illustrated in FIG. 7, the orthogonal axis component exceeds the voltage limit value when the motor 1 rapidly increases in speed or when the DC voltage source 9 rapidly decreases in voltage, specifically when the speed rapidly increases due to idling as in an electric vehicle such as an electric automobile. As described above, even when the orthogonal axis component exceeds the voltage limit value, the current control can be prevented from becoming ineffective by causing weak magnetic flux control to work.

The present embodiment enables implementing stable current control even near a voltage limit when a voltage command value based on a magnetic flux command value is limited.

Third Embodiment

Figure 15:
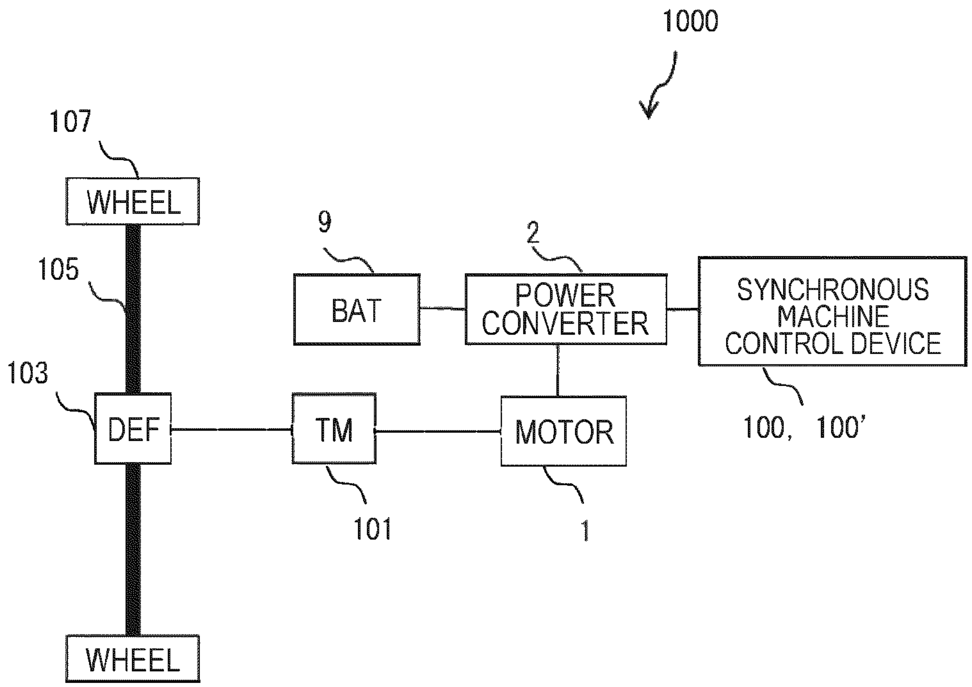
FIG. 15 is a configuration diagram of an electric vehicle in a third embodiment.

FIG. 15 is a configuration diagram of an electric vehicle 1000 according to a third embodiment of the present invention. The electric vehicle 1000 includes the motor 1 as a drive source, the motor being controlled by the synchronous machine control device 100 described in the first embodiment or the synchronous machine control device 100' described in the second embodiment.

As illustrated in FIG. 15, the synchronous machine control devices 100 and 100' control power supplied from the power converter 2 to the motor 1. The DC voltage source 9 such as a battery supplies power to the power converter 2. The motor 1 is connected to a transmission 101. The transmission 101 is connected to a drive shaft 105 using a differential gear 103 and supplies power to wheels 107. The power converter 2 may be directly connected to the differential gear 103 without providing the transmission 101 or the motor 1 and the power converter 2 may be applied to each of a front wheel and a rear wheel.

The electric vehicle 1000 such as an electric automobile or a hybrid automobile has progressed in high-speed rotation of the motor 1 and improvement of a voltage utilization rate to downsize the motor 1. Although the synchronous machine control devices 100 and 100' perform control using high voltage up to near a voltage limit value of an inverter to improve the voltage utilization rate, the present embodiment enables stable current control even near a voltage limit. Although the electric vehicle 1000 is particularly required to stably operate near the voltage limit as compared with other products such as an elevator, the present embodiment enables stable operation near the voltage limit, and thus leading to improvement in the voltage utilization rate and reduction in the amount of power consumption.

According to the embodiments described above, the following operational effects can be obtained.

(1) The synchronous machine control device 100 drives and controls the synchronous machine 1, the synchronous machine control device 100 including: the current command computation unit 24 that calculates a difference between a current command value for the synchronous machine 1 and an actual current flowing through the synchronous machine 1 and generates a current command value by proportional-integral control; the voltage vector computation unit 19 that generates a voltage command value including a coaxial voltage command value and an orthogonal axis voltage command value based on the current command value generated by the current command computation unit 24; the voltage limitation unit 28 that limits the coaxial voltage command value in preference to the orthogonal axis voltage command value to prevent the voltage command value from exceeding a predetermined voltage limit value; and the correction amount calculation unit 26 that calculates the amount of correction of a current command value for correcting the current command value based on limitation of voltage determined by the voltage limitation unit 28, the current command computation unit 24 being configured to correct the current command value by the proportional-integral control based on the amount of correction of a current command value. This configuration enables implementing stable current control even near a voltage limit.

(2) The synchronous machine control device 100' drives and controls the synchronous machine 1, the synchronous machine control device 100' including: the first magnetic flux command computation unit 21 that generates a first magnetic flux command value from a current command value for the synchronous machine 1; the magnetic flux estimation unit 23 that acquires a magnetic flux estimation value from an actual current flowing through the synchronous machine 1; the second magnetic flux command computation unit 25 that calculates a difference between the first magnetic flux command value and the magnetic flux estimation value, and generates a second magnetic flux command value by proportional-integral control; the voltage vector computation unit 19 that generates a voltage command value including a coaxial voltage command value and an orthogonal axis voltage command value based on the second magnetic flux command value; the voltage limitation unit 28 that limits the coaxial voltage command value in preference to the orthogonal axis voltage command value to prevent the voltage command value from exceeding a predetermined voltage limit value; and the correction amount calculation unit 27 that calculates the amount of correction of a magnetic flux command value for correcting the second magnetic flux command value based on limitation of voltage determined by the voltage limitation unit 28, the second magnetic flux command computation unit 25 being configured to correct the second magnetic flux command value by the proportional-integral control based on the amount of correction of a magnetic flux command value. This configuration enables implementing stable current control even near a voltage limit.

(3) The synchronous machine control method is for driving and controlling the synchronous machine 1, the method including: calculating a difference between a current command value for the synchronous machine 1 and an actual current flowing through the synchronous machine 1 and generating a current command value by proportional-integral control; generating a voltage command value including a coaxial voltage command value and an orthogonal axis voltage command value based on the generated current command value; limiting the coaxial voltage command value in preference to the orthogonal axis voltage command value to prevent the voltage command value from exceeding a predetermined voltage limit value; calculating the amount of correction of a current command value for correcting the current command value based on the limitation of the coaxial voltage command value; and correcting an integrator coaxially applied to the proportional-integral control based on the amount of correction of a current command value, the amount corresponding to an excess of a coaxial component in an excess of voltage exceeding the voltage limit value due to the limitation of the coaxial voltage command value. This configuration enables implementing stable current control even near a voltage limit.

The present invention is not limited to the above-described embodiments, and other forms conceivable within the scope of the technical idea of the present invention are also included within the scope of the present invention as long as features of the present invention are not impaired. The above-described embodiments may be combined.

REFERENCE SIGNS LIST

1 motor
2 power converter
3 phase current detector
4 magnetic pole position detector
5 frequency computation unit
6 DC voltage detector
7 current coordinate converter
9 DC voltage source
11 coordinate converter
12 PWM controller
18, 19 voltage vector computation unit
21 first dq-axis magnetic flux command computation unit
23 dq-axis magnetic flux estimation unit
24 second dq-axis current command computation unit
25 second dq-axis magnetic flux command computation unit
26, 27 correction amount calculation unit
28, 29 voltage limitation unit
75 amplitude and phase angle computation unit
76 amplitude and phase angle computation unit
77 limitation unit
78, 91, 93 cosine wave generator
79, 92, 94 sine wave generator
80, 81, 88, 89 multiplier
82 limit value computation unit
83, 87 subtractor
85 square root difference computation unit
99 voltage selector
99A magnetic flux command value correction amount computation unit
100, 100' synchronous machine control device
101 transmission
103 differential gear
105 drive shaft
107 wheel

The invention claimed is:

1. A synchronous machine control device configured to drive and control a synchronous machine, the synchronous machine control device comprising:

a current command computation unit that calculates a difference between a current command value for the synchronous machine and an actual current flowing through the synchronous machine and generates a current command value by proportional-integral control;

a voltage vector computation unit that generates a voltage command value including a coaxial voltage command value and an orthogonal axis voltage command value based on the current command value generated by the current command computation unit;

a voltage limitation unit that limits the coaxial voltage command value in preference to the orthogonal axis voltage command value to prevent the voltage command value from exceeding a predetermined voltage limit value; and a correction amount calculation unit that calculates an amount of correction of a current command value for correcting the current command value based on limitation of voltage determined by the voltage limitation unit, the current command computation unit being configured to correct the current command value by the proportional-integral control based on the amount of correction of a current command value.

2. A synchronous machine control device configured to drive and control a synchronous machine, the synchronous machine control device comprising:

a first magnetic flux command computation unit that generates a first magnetic flux command value from a current command value for the synchronous machine;

a magnetic flux estimation unit that acquires a magnetic flux estimation value from an actual current flowing through the synchronous machine;

a second magnetic flux command computation unit that calculates a difference between the first magnetic flux command value and the magnetic flux estimation value, and generates a second magnetic flux command value by proportional-integral control;

a voltage vector computation unit that generates a voltage command value including a coaxial voltage command value and an orthogonal axis voltage command value based on the second magnetic flux command value;

a voltage limitation unit that limits the coaxial voltage command value in preference to the orthogonal axis voltage command value to prevent the voltage command value from exceeding a predetermined voltage limit value; and a correction amount calculation unit that calculates an amount of correction of a magnetic flux command value for correcting the second magnetic flux command value based on limitation of voltage determined by the voltage limitation unit, the second magnetic flux command computation unit being configured to correct the second magnetic flux command value by the proportional-integral control based on the amount of correction of a magnetic flux command value.

3. The synchronous machine control device according to claim 1, wherein the current command computation unit corrects an integrator coaxially applied to the proportional-integral control based on the amount of correction of a current command value, the amount corresponding to an excess of the coaxial component in an excess of voltage exceeding the voltage limit value due to the limitation of voltage.

4. The synchronous machine control device according to claim 1, wherein the current command computation unit corrects an integrator applied to an orthogonal axis of the proportional-integral control based on the amount of correction of a current command value, the amount corresponding to an excess of an orthogonal axis component in an excess of voltage exceeding the voltage limit value due to the limitation of voltage.

5. The synchronous machine control device according to claim 3 or 4, wherein the current command computation unit corrects an integrator applied to a q-axis based on the amount of correction of a current command value, the amount corresponding to an excess of voltage in the coaxial direction of a d-axis in the excess of voltage.

6. The synchronous machine control device according to claim 2, wherein the secondary magnetic flux command computation unit corrects an integrator coaxially applied to the proportional-integral control based on the amount of correction of a magnetic flux command value, the amount corresponding to an excess of the coaxial component in an excess of voltage exceeding the voltage limit value due to the limitation of voltage.

7. The synchronous machine control device according to claim 2, wherein the second magnetic flux command computation unit corrects an integrator applied to an orthogonal axis of the proportional-integral control based on the amount of correction of a magnetic flux command value, the amount corresponding to an excess of an orthogonal axis component in an excess of voltage exceeding the voltage limit value due to the limitation of voltage.

8. The synchronous machine control device according to claim 6 or 7, wherein the second magnetic flux command computation unit corrects an integrator applied to a q-axis based on the amount of correction of a magnetic flux command value, the amount corresponding to an excess of voltage in the coaxial direction of a d-axis in the excess of voltage.

9. An electric vehicle comprising:

the synchronous machine control device according to claim 1 or 2; and a synchronous machine driven and controlled by the synchronous machine control device.

10. A synchronous machine control method that is for driving and controlling a synchronous machine, the method comprising:

calculating a difference between a current command value for the synchronous machine and an actual current flowing through the synchronous machine and generating a current command value by proportional-integral control;

generating a voltage command value including a coaxial voltage command value and an orthogonal axis voltage command value based on the generated current command value;

limiting the coaxial voltage command value in preference to the orthogonal axis voltage command value to prevent the voltage command value from exceeding a predetermined voltage limit value;

calculating the amount of correction of a current command value for correcting the current command value based on the limitation; and correcting an integrator coaxially applied to the proportional-integral control based on the amount of correction of a current command value, the amount corresponding to an excess of a coaxial component in an excess of voltage exceeding the voltage limit value due to the limitation.

* * * * *